(12) United States Patent
Toyoda

(10) Patent No.: US 7,380,999 B2
(45) Date of Patent: Jun. 3, 2008

(54) SHUTTER DEVICE AND IMAGE PICK UP APPARATUS

(75) Inventor: Yasuhiro Toyoda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 11/241,562

(22) Filed: Sep. 30, 2005

(65) Prior Publication Data

US 2006/0067676 A1    Mar. 30, 2006

(30) Foreign Application Priority Data

Sep. 30, 2004    (JP)    ............................. 2004-286779

(51) Int. Cl.
*G03B 9/08*    (2006.01)
(52) U.S. Cl. .................. 396/466; 396/484; 348/362
(58) Field of Classification Search ................ 396/466, 396/484, 489; 348/362
See application file for complete search history.

(56) References Cited

U.S. PATENT DOCUMENTS

| 4,034,390 A * | 7/1977 | Urano et al. ................ 396/482 |
| 4,225,221 A * | 9/1980 | Saito et al. ................ 396/443 |
| 4,378,150 A | 3/1983 | Hashimoto et al. |
| 6,749,348 B2 * | 6/2004 | Seita ........................... 396/443 |
| 6,850,281 B2 * | 2/2005 | Takahashi .................... 348/363 |
| 7,344,321 B2 * | 3/2008 | Nakagawa ................... 396/443 |
| 2003/0002877 A1 * | 1/2003 | Kudo et al. ................ 396/489 |

FOREIGN PATENT DOCUMENTS

JP    2001-174871    6/2001

* cited by examiner

*Primary Examiner*—W B Perkey
(74) *Attorney, Agent, or Firm*—Cowan, Liebowitz & Latman, P.C.

(57) ABSTRACT

A shutter device, which is capable of achieving power-saving when holding a shutter opening in an open state for a long time by mechanically inhibiting an operation of a second light shielding plate in a direction to close the shutter opening, is provided. The shutter device has a second light shielding plate locking member 37 displaceable to a locking position to inhibit a shutter opening closing operation of the second light shielding plates 10 to 13 and an unlocking position to allow the shutter opening closing operation of the second light shielding plates. The second light shielding plate locking member displaces to the locking position at a point of time when first light shielding plates 2 to 5 fully open the shutter opening, and displaces to the unlocking position immediately before the second light shielding plates start running.

6 Claims, 11 Drawing Sheets

SHUTTER DEVICE AND IMAGE PICK UP APPARATUS

BACKGROUND OF THE INVENTION

1. Field of the Invention

The present invention relates to a construction of a shutter of an image pick up apparatus such as a digital camera having a function of displaying a visual image picked up by an image pick up element on a visual image display device of liquid crystal or the like.

2. Related Background Art

Various kinds of shutter devices as follows are used in conventional digital cameras each having a function of displaying an object image picked up by an image pick up element on a monitor such as an LCD (Liquid Crystal Display) as a finder image for observing an object.

A first prior art example is a conventional shutter device used in a silver camera. As is well known, the conventional shutter device holds curtain groups divided into two or more with two arms to be rotatable to form a parallel link. This shutter device has a front curtain which shifts a shutter opening to an open state from a shielded state at a time of exposure, and a rear curtain which shifts the shutter opening to the shielded state from the open state at the time of exposure. The front curtain is connected to a front driving member having a driving source for running a blade such as a spring, and an armature which is suction-held by a magnet. Then, in a preparation state for image pick up and recording, the armature is brought into contact with a yoke suction surface of a magnet for the front curtain by a charge lever, and the front curtain is held in a state in which it shields the shutter opening. The rear curtain is connected to a rear driving member of the same construction as that of the front curtain. In the preparation state for image pick up and recording, the armature is brought into contact with a yoke suction surface of a magnet for the rear curtain by the charge lever, and the rear curtain is held in a state in which it opens the shutter opening. After release, the charge lever retreats from the curtain holding position, and the front curtain and the rear curtain are held in a start position by a magnetic force of the energized magnet. Then, energization for the magnet for the front curtain is cut off first, the front curtain releases the shutter opening, then, predetermined seconds later, energization for the magnet for the rear curtain is cut off, and the rear curtain shields the shutter opening. Exposure time is thus formed and the screen is exposed. After completion of running, the front curtain and the rear curtain move to the image pick up preparation position by the charge lever, and wait for the next photographing. The first prior example is constructed as above.

A second prior art is a focal plane-shutter device for a digital camera disclosed in Japanese Patent Application Laid-Open No. 2001-215555 and Japanese Patent Application Laid-Open No. 2002-23220. When power is applied to a camera including a shutter device of this kind, a front curtain is in the state to open a shutter opening, so that an object can be normally observed with a monitor such as an LCD.

A third prior art example is a shutter device disclosed in Japanese Patent Application Laid-Open No. S57-17935, in which when running of a front curtain is not detected by a detecting device which detects running of the front curtain, running of the rear curtain is inhibited by an inhibiting member.

In the above described first prior art, on the occasion of observing an object with a monitor such as an LCD, the object image is caught by an image pick up element, and therefore, the front curtain needs to fully open the shutter opening. In the shutter device of the first prior art example, the armature is sucked by energizing the coil of the magnet for the front curtain, and the front curtain is held in the running start position. When a start signal to operate the front curtain to open the shutter opening is inputted, energization for the coil of the magnet for the front curtain is cut off, the armature is released from suction to the yoke, and the suction surface of the above described magnet is in the uncovered state. When the rear curtain is held in the running start position, the armature is sucked by energizing the coil of the magnet for the rear curtain. When the object is observed with the monitor such as an LCD, the object image is picked up by the image pick up element, and therefore, in the state in which the front curtain fully opens the shutter opening, the charge lever which mechanically holds both the front curtain and the rear curtain in the overcharge state returns to the retreat position. Therefore, the coil of the magnet for the rear curtain has to keep energized so that the rear curtain does not close the shutter opening. Therefore, there is the disadvantage of wastefully consuming electric power. Further, when the time to observe the object with the monitor such as an LCD is long, the temperature of the coil of the magnet for the rear curtain which is kept energized becomes considerably high. When the photographer picks up an image in this state, there is the disadvantage of lowering control accuracy of the exposure time at a high-speed exposure time due to instability of the operation characteristics of the magnet for the rear curtain.

Besides, the above described second prior art has a high risk of dust attaching to a low path filter and the like disposed at a front surface of the image pick up element, because when it is used for a system camera capable of replacing a lens, the shutter opening is kept open at the time of replacement of the lens. When dust attaches to the low path filter and the like, quality of the picked up image is degraded. It is conceivable that the image pick up element is irradiated with sun light for a long time when the camera is left in the bright outdoors or the like without a lens cap or the like put on, which easily causes deterioration such as color fading of the color filter provided at the image pick up element.

Besides, in the above described third prior art example, movement of the inhibiting member which inhibits running of the rear curtain uniquely links to the movement of the detecting device which detects running of the front curtain, and therefore, only the position for releasing the running inhibition of the rear curtain can be taken in the state in which running of the front curtain is completed.

Therefore, it is conceivable that the shutter devices are susceptible to improvement to solve these problems.

SUMMARY OF THE INVENTION

At least one preferred embodiment constructs a shutter device having a first light shielding plate and a second light shielding plate which are formed to open and close an opening, a first driving member which includes a first armature, and is connected to the first light shielding plate to give an urging force to the first light shielding plate in a direction to open the opening, a first electromagnetic device which makes the first light shielding plate in a first position capable of running in the direction to open the opening by being switched to a non-energized state from an energized state in which it suction-holds the first armature, a second driving member which includes a second armature, and is connected to the second light shielding plate and gives an urging force to the second light shielding plate in a direction to close the opening, a second electromagnetic device for the second light shielding plate which makes the second light shielding plate in a second position capable of running in the direction to close the opening by being switched to a non-energized state from an energized state in which it suction-holds the second armature, and a locking member displaceable to a locking position to inhibit an operation of the second light shielding plate of running in the direction to close the opening, and an unlocking position to allow an operation of the second light shielding plate of running in the direction to close the opening, in which the locking member displaces to the locking position by the first light shielding plate running in the direction to open the opening, and displaces to the unlocking position by the first electromagnetic device being switched to the energized state from the non-energized state before the second light shielding plate starts running in the direction to close the opening, and an image pick up apparatus including this.

Further features of the present invention will become apparent from the following detailed description of exemplary embodiments with reference to the attached drawings.

DESCRIPTION OF THE PREFERRED EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Exemplary embodiments will be described in detail below with reference to the drawings.

Embodiment

Figure 1:
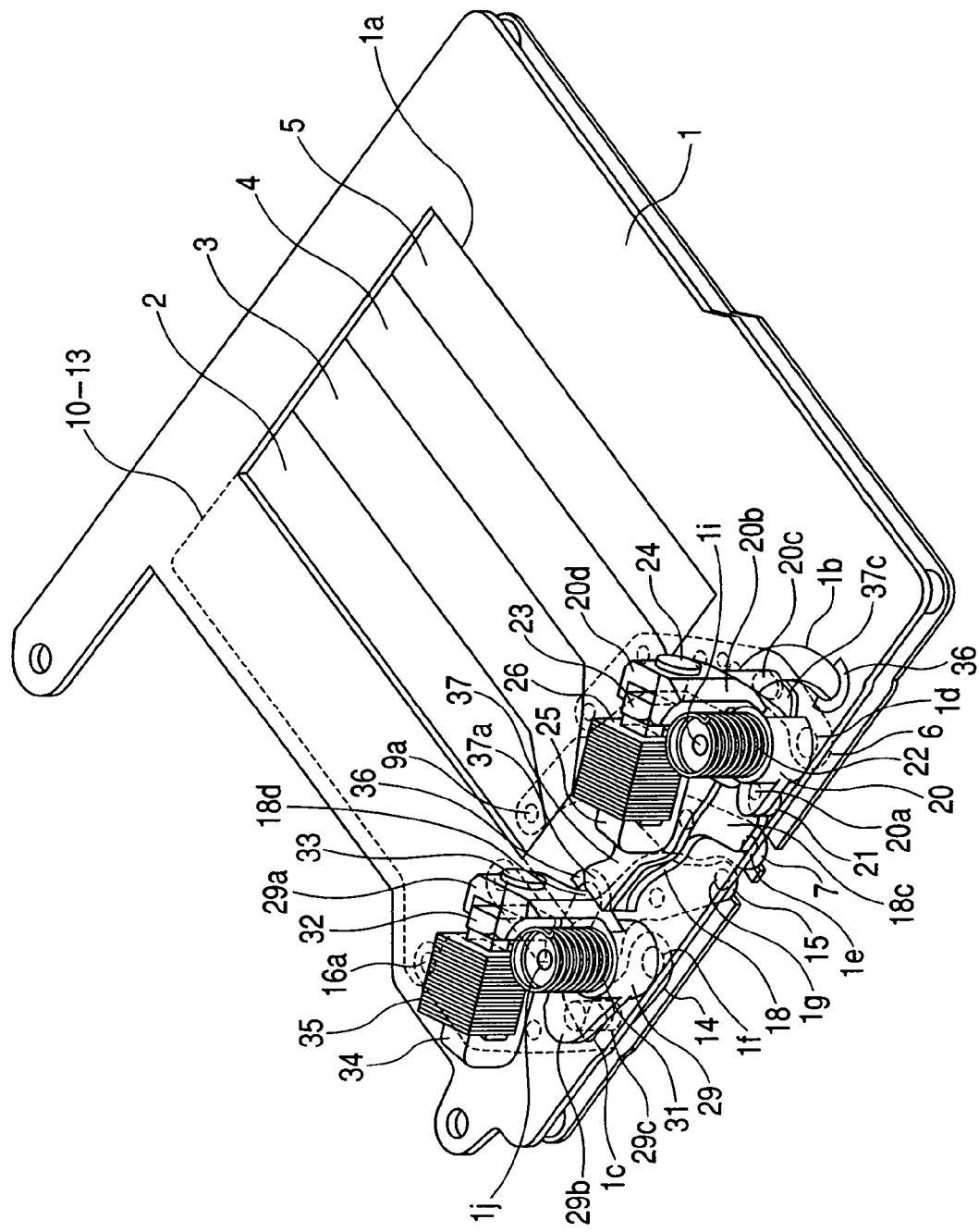
FIG. 1 is a perspective view showing a state in which running preparation is completed in a focal plane-shutter device according to one embodiment of the present invention.
Figure 2:
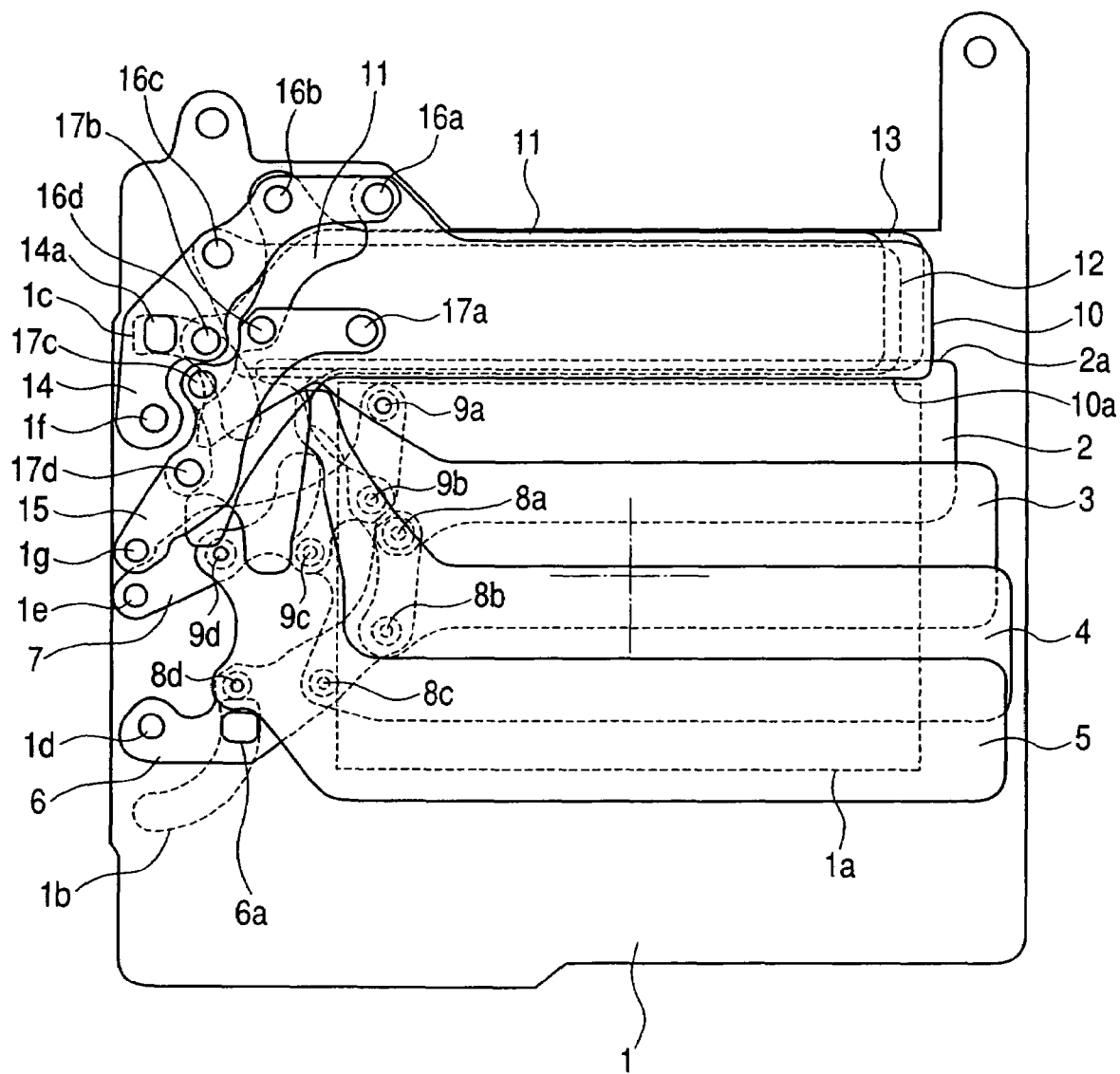
FIG. 2 is a front view showing a state in which running preparation of a curtain unit is completed in the focal plane-shutter device according to one embodiment of the present invention.
Figure 3:
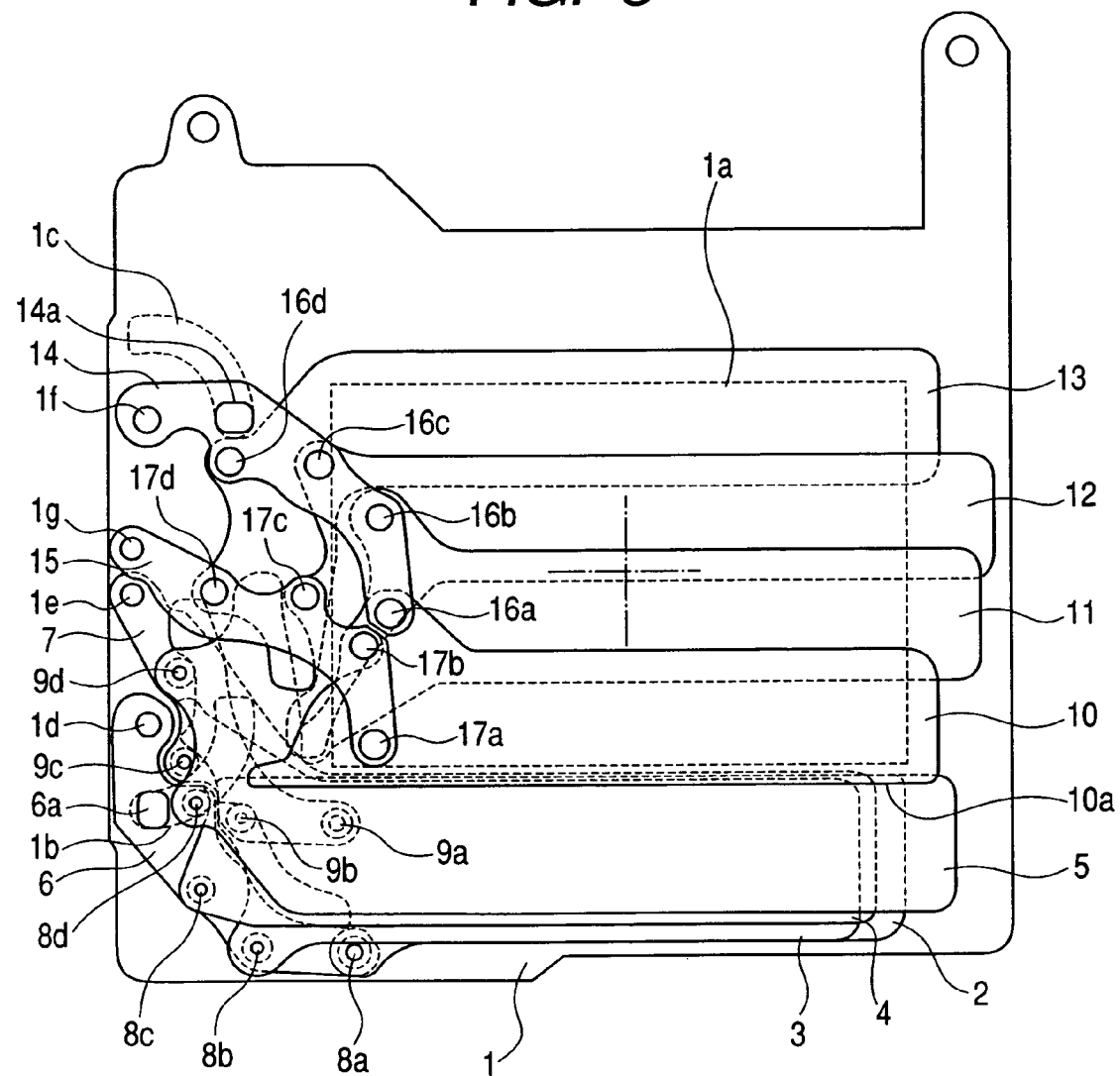
FIG. 3 is a front view showing a state in which running of a curtain unit is completed in the focal plane-shutter device according to one embodiment of the present invention.
Figure 4:
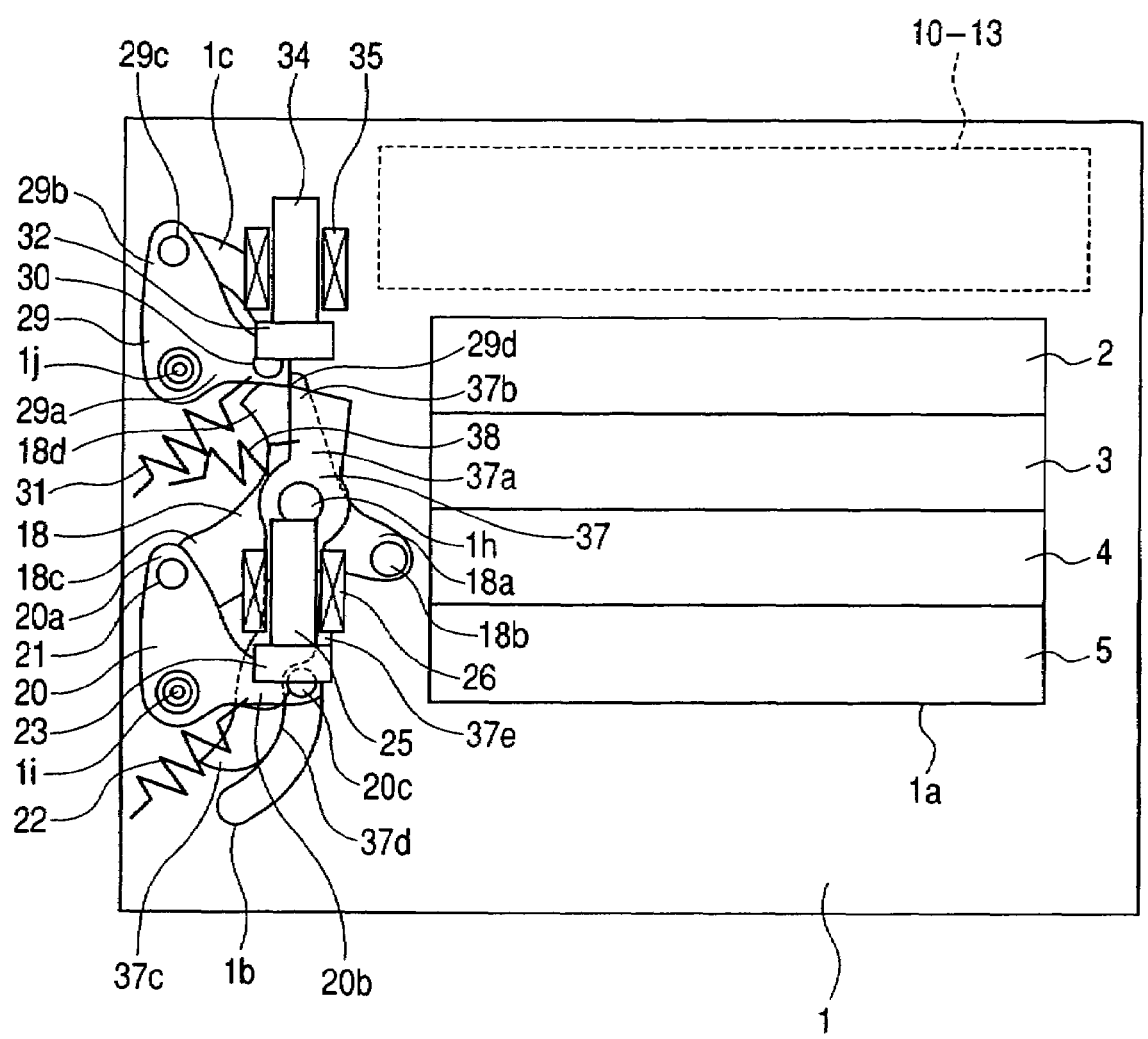
FIG. 4 is a schematic plan view showing an operation of a main part in the state in which running preparation is completed in the focal plane-shutter device according to the one embodiment of the present invention.
Figure 5:
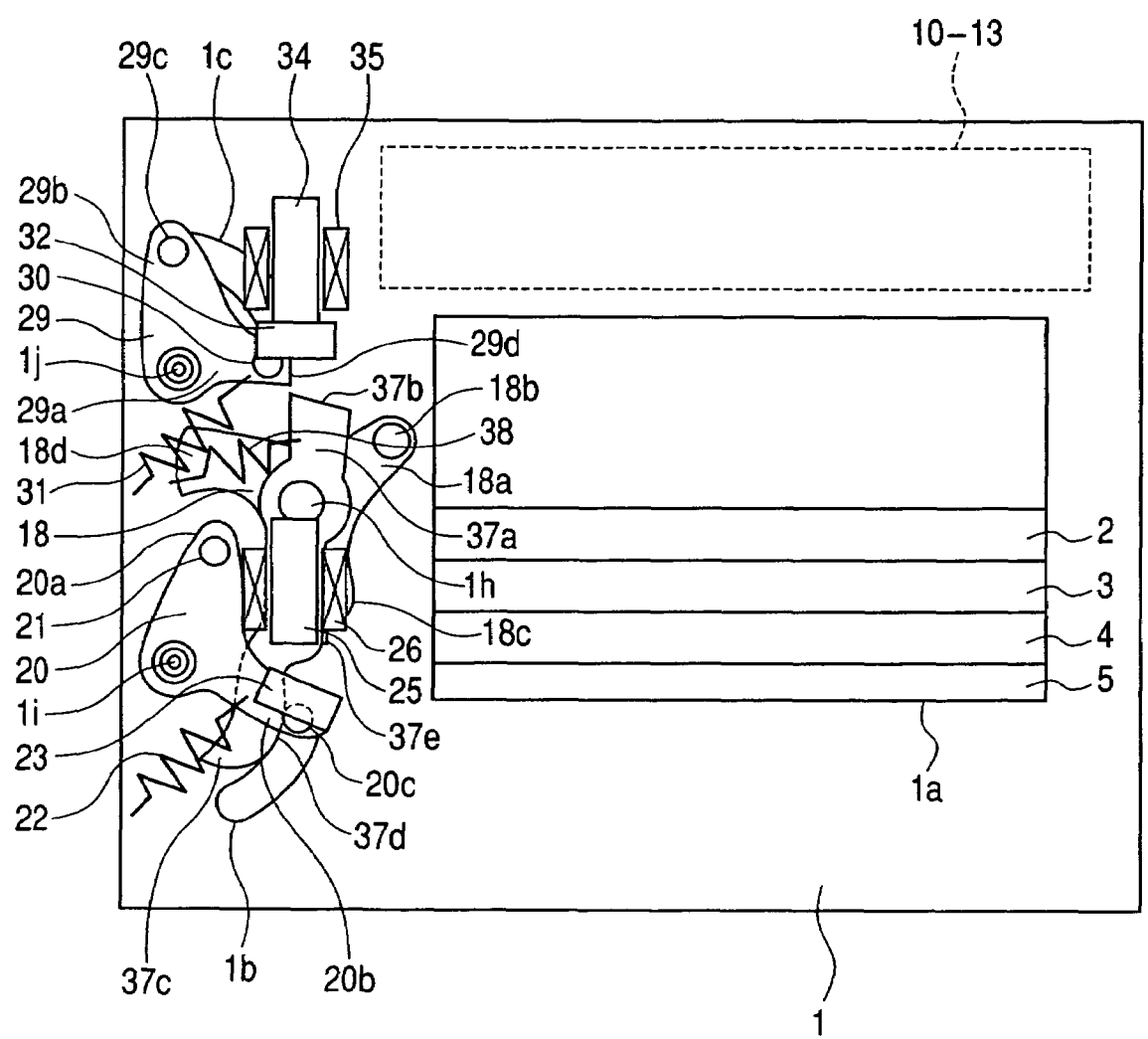
FIG. 5 is a schematic plan view showing an operation of a main part in a state in which running for exposure is started, or a state in which shift to observation in an EVF is started, in the focal plane-shutter device showing the one embodiment of the present invention.
Figure 6:
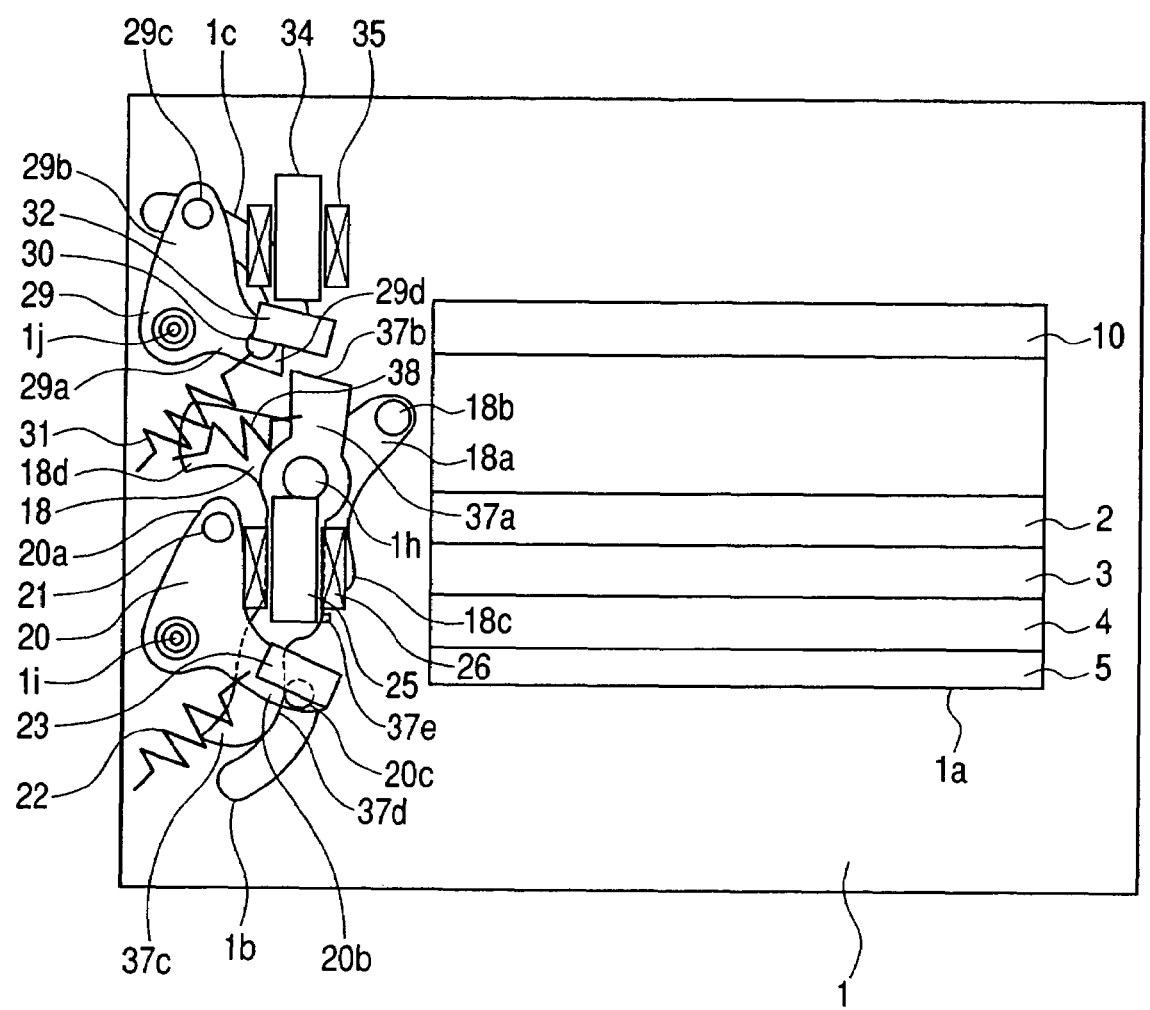
FIG. 6 is a schematic plane view showing an operation of the main part in the state in which running for exposure is started in the focal plane-shutter device according to the one embodiment of the present invention.
Figure 7:
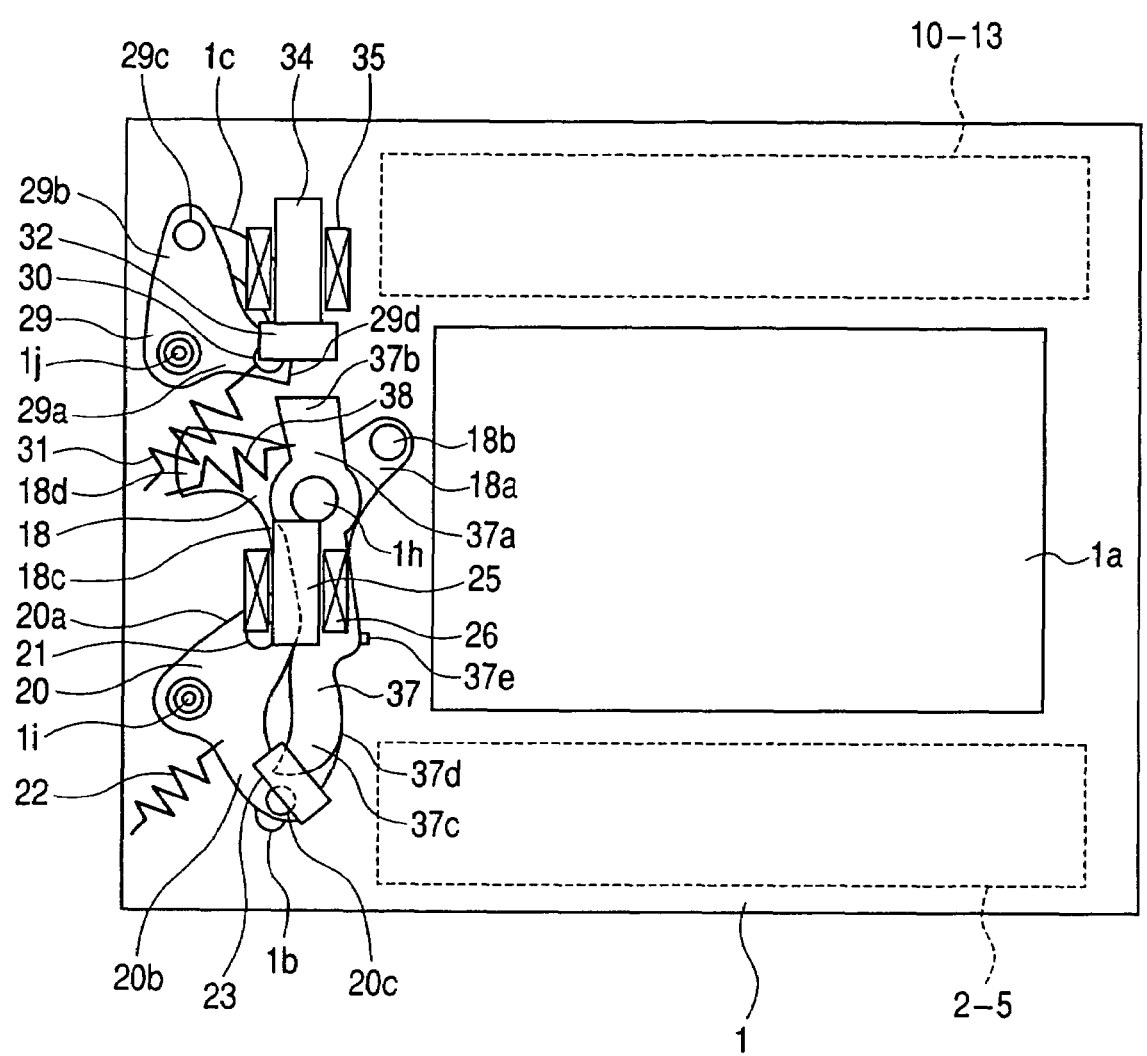
FIG. 7 is a schematic plane view showing an operation of a main part in an open state of exposure opening (EVF observation) in which running of a front curtain is completed in the focal plane-shutter device according to the one embodiment of the present invention.
Figure 8:
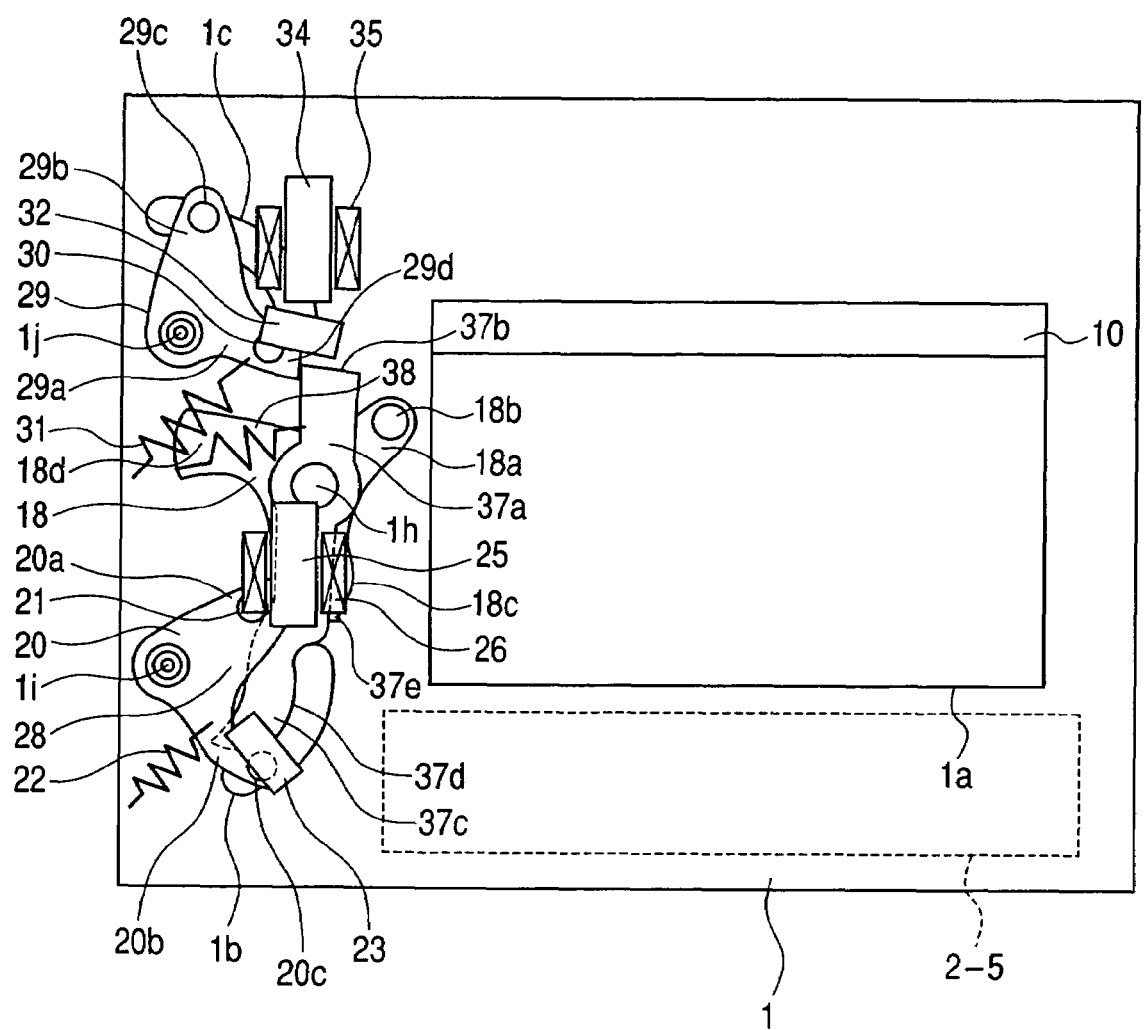
FIG. 8 is a schematic plane view showing an operation of a main part in a state on the way to closing the exposure opening from opening of the exposure opening in the focal plane-shutter device according to the one embodiment of the present invention.
Figure 9:
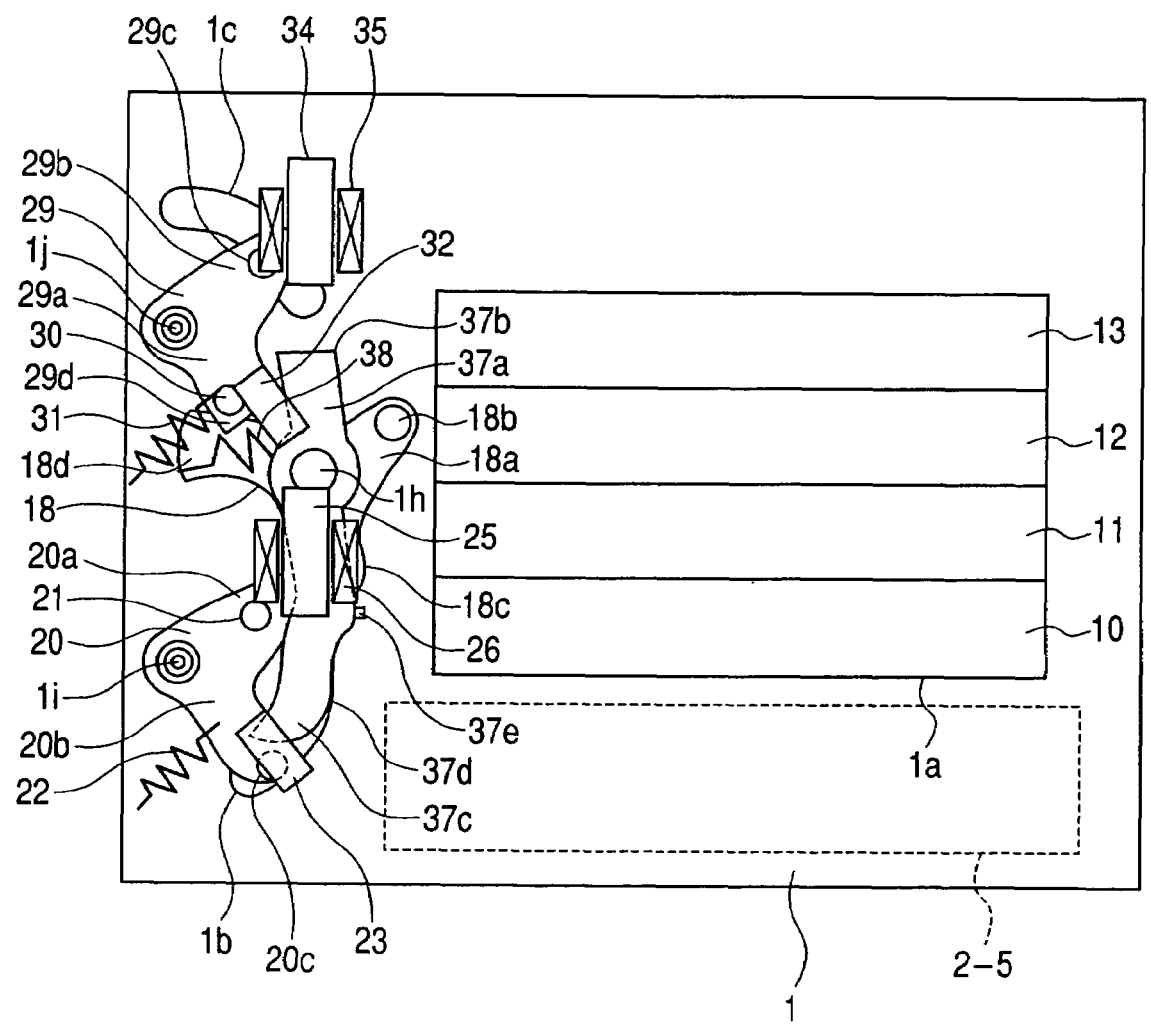
FIG. 9 is a schematic plan view showing an operation of an essential part in a state in which exposure is completed in the focal plane-shutter device according to the one embodiment of the present invention.
Figure 10:
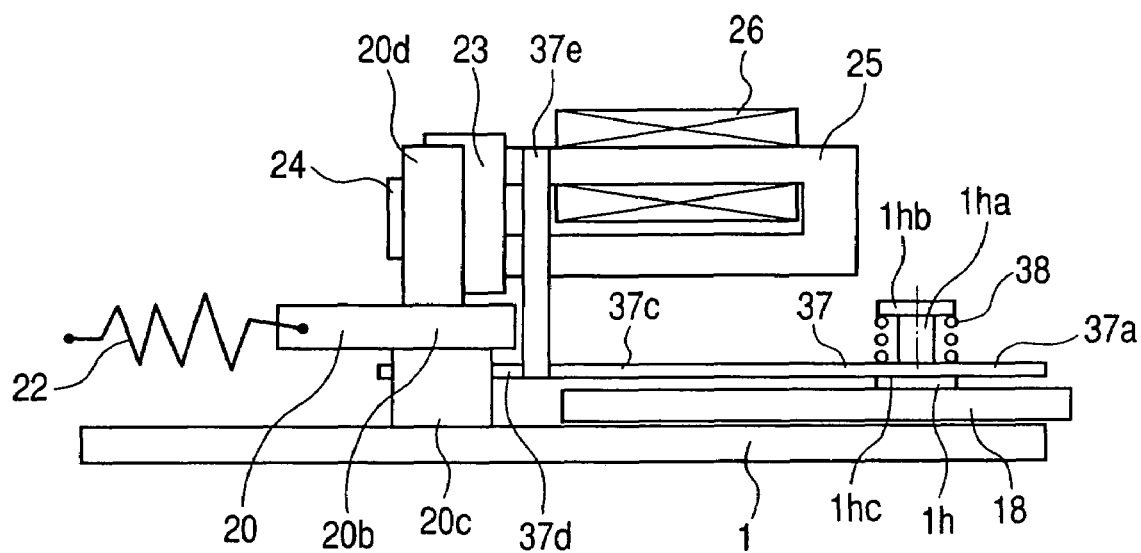
FIG. 10 is a schematic side view showing a driving mechanism of a rear curtain locking member in a rear curtain locking releasing state in the focal plane-shutter device according to the one embodiment of the present invention.
Figure 11:
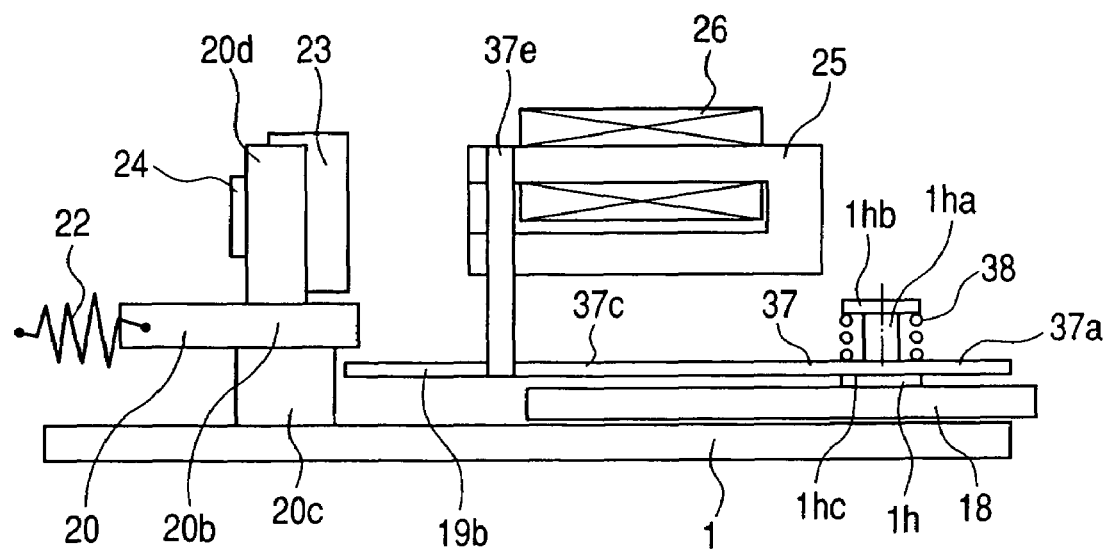
FIG. 11 is a schematic side view showing the driving mechanism of the rear curtain locking member in a rear curtain locking state in the focal plane-shutter device according to the one embodiment of the present invention.

FIGS. 1 to 11 are views showing a focal-plane shutter according to one embodiment of the present invention. More specifically, FIG. 1 is a perspective view of a state in which running preparation of a shutter unit is completed, and a base plate or the like for holding a magnet is omitted to make a main part visible. FIGS. 2 and 3 are front views of a focal-plane shutter curtain unit, FIG. 2 shows a state in which the running preparation is completed, and FIG. 3 shows the state in which running is completed. FIGS. 4 to 9 are schematic plane view showing an operation of the main part, FIG. 4 shows a state in which the running preparation is completed, FIG. 5 shows a state in which running for exposure is started, or a state in which shift to observation with an EVF is started. FIG. 6 shows a state in which running for slit exposure is started, FIG. 7 shows an open (EVF observation) state of an exposure opening after running of a front curtain is completed, FIG. 8 shows a state of a midway of shift to a closed state from an open state of the exposure opening, and FIG. 9 shows a state in which exposure is completed, respectively. FIGS. 10 and 11 are schematic side views showing a driving mechanism of a rear curtain locking member, FIG. 10 shows a state in which locking of the rear curtain is released, and FIG. 11 shows a state in which the rear curtain is locked, respectively.

Figure 12:
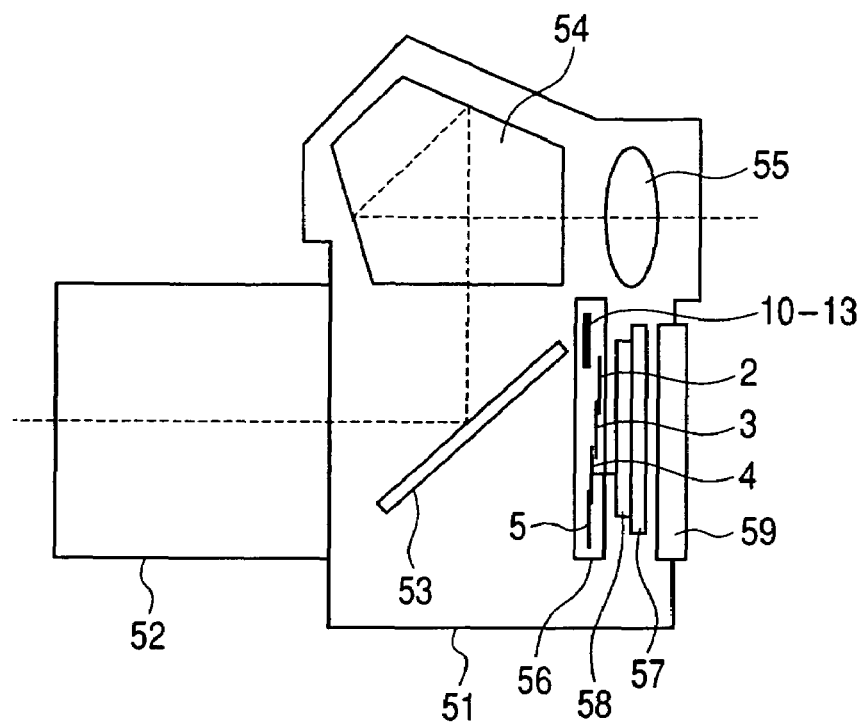
FIG. 12 is a longitudinal sectional view of a center of a camera of a digital single lens reflex camera system including the focal plane-shutter device of the present embodiment.
Figure 13:
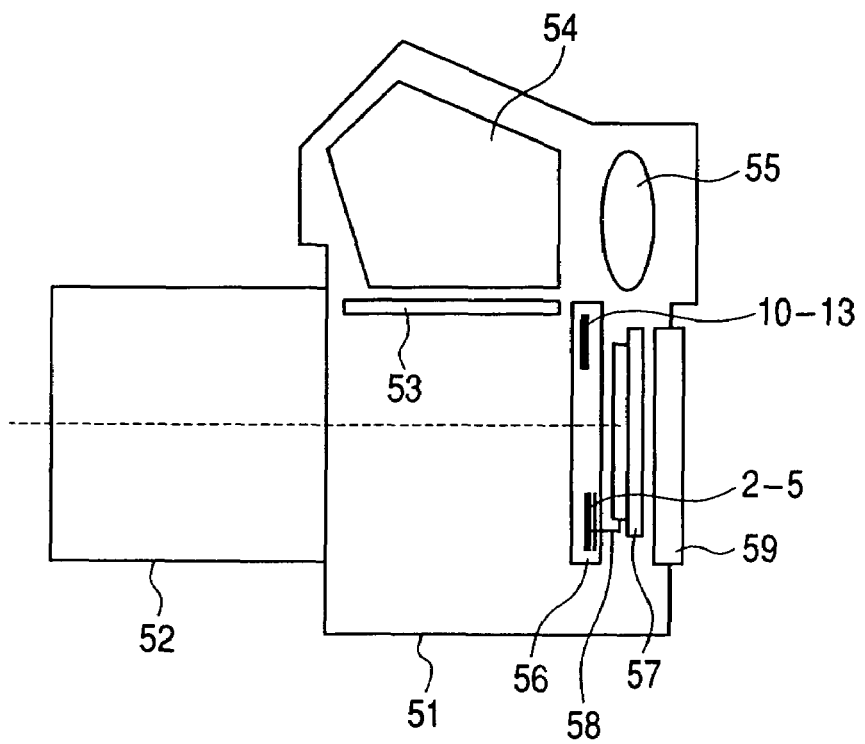
FIG. 13 is a longitudinal sectional view of the center of the camera of the digital single lens reflex camera system including the focal plane-shutter device of the same embodiment.

FIG. 12 is a central longitudinal sectional view of a camera of a digital single lens reflex camera system including a focal-plane shutter device according to one embodiment of the present invention shown in FIGS. 1 to 11, and shows a state in which an object is observed with an OVF (optical view finder). Similarly, FIG. 13 is a central longitudinal sectional view of the camera of the digital single lens reflex camera system including the focal-plane shutter device according to the one embodiment of the present invention shown in FIGS. 1 to 11, and shows a state where an object is observed with an EVF (electronic view finder).

In FIGS. 1 to 11, reference numeral 1 denotes a base board having a shutter opening (hereinafter, described as a shutter base plate), and reference numeral and character 1*a* denotes a shutter opening. Reference numeral and character 1*b* denotes a long hole for escaping a running locus of a drive pin of a later-described second front curtain driving member (a lever which gives running energy by a spring force or the like to the front curtain) shown in FIG. 4 and the like. Reference numeral and character 1*c* denotes a long hole for escaping a running locus of a drive pin of a later-described rear curtain driving member (a lever which gives running energy by a spring force or the like to the rear curtain) 29 shown in FIG. 4 and the like.

Reference numeral 2 denotes a slit forming front curtain, and has a slit forming end 2*a*. Reference numerals 3 to 5 denote cover front curtains, and are described as a first front curtain 3, a second front curtain 4 and a third front curtain 5 in sequence. Reference numeral 6 denotes a first arm for the front curtain, is pivotally attached to be rotatable around a shaft 1*d* provided at the shutter base plate 1, and supports the slit forming front curtain 2 rotatably with respect to the first arm 6 with a crimp dowel 8*a* which is provided at a tip end side of the first arm 6. Reference numeral and character 6*a* denotes a hole in which a drive pin 20*c* of the later-described front curtain driving member 20 is fitted, and via this hole 6*a*, power is transmitted from the front curtain driving member 20 provided with a rotating shaft 1*i* coaxially with the shaft 1*d*. Reference numeral 7 denotes a second arm, which is pivotally attached rotatably around a shaft 1*e* provided at the shutter base plate 1, and supports the slit forming front curtain 2 to be rotatable with respect to the second arm 7 with a crimp dowel 9*a* provided at a tip end side of the second arm 7. In this manner, a parallel link is formed by the slit forming front curtain 2, the first arm 6 and the second arm 7 for the front curtain. Similarly, among the cover front curtains, the first front curtain 3, the second front curtain 4 and the third front curtain 5 are rotatably supported at the intermediate portions of the first arm 6 and the second arm 7 for the front curtain with respective crimp dowels 8*b* and 9*b*, 8*c* ad 9*c* and 8*d* and 9*d* to form a parallel link. Thus, the front curtain that is a first light shielding plate is constructed by the respective members 2 to 9.

The rear curtain has the same construction as the front curtain. In FIG. 3 and the like, reference numeral 10 denotes a slit forming rear curtain, 10*a* is a slit forming end, reference numerals 11 to 13 denote cover rear curtains, and are described as a first rear curtain 11, a second rear curtain 12 and a third rear curtain 13 in sequence. Reference numeral 14 denotes a first arm for the rear curtain, is pivotally attached to be rotatable around a shaft 1*f* provided at the shutter base plate 1, and supports the slit forming rear curtain 10 rotatably with respect to the first arm 14 with a crimp dowel 16*a* which is provided at a tip-end side of the arm. Reference numeral and character 14*a* denotes a hole in which a drive pin 29*c* of the rear curtain driving member 29 is fitted, and via this hole 14*a*, power is transmitted from the rear curtain driving member provided with a rotating shaft 1*j* coaxially with the shaft 1*f*. Reference numeral 15 denotes a second arm for the rear curtain, which is pivotally attached rotatably around a shaft 1*g* provided at the shutter base plate 1, and supports the slit forming rear curtain 10 to be rotatable with respect to the second arm 15 with a crimp dowel 17*a* provided at a tip end side of the second arm 15. In this manner, a parallel link is formed by the slit forming rear curtain 10, the first arm 14 and the second arm 15 for the rear curtain. Similarly, among the cover rear curtains, the first rear curtain 11, the second rear curtain 12 and the third rear curtain 13 are rotatably supported at the intermediate portions of the first arm 14 and the second arm 15 with respective crimp dowels 16*b* and 17*b*, 16*c* and 17*c* and 16*d* and 17*d* to form a parallel link. Thus, the rear curtain that is a second shielding plate is constructed by the members 10 to 17.

Reference numeral 18 shown in FIG. 4 and the like denotes a charge lever, which is supported rotatably around a shaft 1*h* planted on the shutter base plate 1, and is pressed in a thrust direction of the shaft 1*h* with a slight space by a slipping-off prevention member not shown. Reference numeral and character 18*a* denotes an input side arm of the charge lever 18, reference numeral and character 18*b* denotes an input pin integrally planted on the input side arm 18*a*, reference numeral and character 18*c* denotes a front curtain side output arm of the charge lever 18, and reference numeral and character 18*d* denotes a rear curtain side output arm of the charge lever 18. The charge lever 18 abuts on a stopper not shown in an overcharge position in FIG. 4 and a charge initial position in FIG. 5 to be restrained from rotating.

Reference numeral 20 denotes a front curtain driving member, which is supported rotatably around the shaft 1*i* planted on the shutter base plate 1, and is pressed in a thrust direction of the shaft 1*i* by a slipping-off prevention member not shown with a very small space. A shaft is integrally planted on a tip end of the arm 20*a* of the front curtain driving member 20, and a roller 21 is rotatably supported around the shaft. The shutter base plate 1 acts on the roller 21 as a slipping-off prevention member. The front curtain drive pin 20*c* is integrally planted on a tip end of another arm 20*b* of the front curtain driving member 20. Reference numeral 22 is a torsion spring (hereinafter, called a front curtain driving spring) provided on the front curtain driving member 20 coaxially with the shaft 1*i*. The torsion spring 22 is supported by a shutter curtain speed adjusting member not shown at one end, and is caught on a spring catching projection (not shown) of the front curtain driving member 20 at the other end, and applies a clockwise rotating force to the front curtain driving member 20 around the shaft 1*i*. An armature holding part 20*d* (see FIG. 10) is formed at an upper portion of a tip end of the arm 20*b* of the front curtain driving member 20, and an armature 23 is integrally held in the armature holding part 20*d* with some degree of freedom of movement given to an armature shaft 24. Reference numeral 25 denotes a yoke that is a component of the magnet for the front curtain (corresponding to a front curtain electromagnetic device), and reference numeral 26 is a coil that is a component of the magnet for the front curtain. The yoke 25 and coil 26 are fixed to a magnet base plate not shown, holds the armature 23 by energizing the coil 26 (see FIG. 10), and releases the armature 23 when energization for the coil 26 is cut off (see FIG. 11). The running timing of the front curtain is controlled by utilizing the operation.

Reference numeral 29 shown in FIG. 4 and the like denotes a rear curtain driving member, which is supported rotatably around the shaft 1*j* planted on the shutter base plate 1, and is pressed in a thrust direction of the shaft 1*j* by a slipping-off prevention member not shown with a very small space. A shaft is integrally planted on a tip end of an arm 29*a* of the rear curtain driving member 29, and a roller 30 is rotatably supported around the shaft. The shutter base plate 1 acts on the roller 30 as a slipping-off prevention member. The rear curtain drive pin 29*c* is integrally planted on a tip end of another arm 29*b* of the rear curtain driving member 29. Reference numeral 31 denotes a torsion spring (hereinafter, called a rear curtain driving spring) provided on the rear curtain driving member 29 coaxially with the shaft 1*j*. The torsion spring 31 is supported by a shutter curtain speed adjusting member not shown at one end, and is caught on a spring catching projection (not shown) of the rear curtain driving member 29 at the other end, and applies a clockwise rotating force to the rear curtain driving member 29 around the shaft 1*j*. An armature holding part 29*d* is formed at an upper portion of the arm 29*a* of the rear curtain driving member 29, and an armature 32, which is a component of the magnet for the rear curtain (corresponding to the electromagnetic device for the rear curtain) is integrally held in the armature holding part 29*d* with some degree of freedom of movement given to an armature shaft 33. Reference numeral 34 denotes a yoke that is a component of the magnet for the rear curtain, and reference numeral 35 is a coil that is a component of the magnet for the rear curtain. The yoke 34 and coil 35 are fixed to a magnet base plate not shown, holds the armature 32 by energizing the coil 36, and releases the armature 32 when energization for the coil 36 is cut off. The running timing of the rear curtain is controlled by utilizing the operation, namely, shutter time is controlled. Reference numeral 36 shown in FIG. 1 denotes a buffer member which receives the front curtain drive pin 20*c* and the rear curtain drive pin 29*c* respectively at the time of completion of running of the shutter curtain.

Reference numeral 37 shown in FIG. 4 and the like denotes a rear curtain locking member composed of a magnetic material, and is supported rotatably around a double tip end small diameter shaft 1*ha* of the shaft 1*h* planted on the shutter base plate 1 as shown in FIGS. 10 and 11. Reference numeral 38 is a rear curtain locking member pulling spring, which is mounted between a top surface of the rear curtain locking member 37 and a flange 1*hb* (see FIGS. 10 and 11) at a foremost end portion of the shaft 1*h*, and weakly gives a counterclockwise rotational force around the shaft 1*ha* to the rear curtain locking member 37.

A rear curtain locking part 37*b* (see FIG. 4) is formed at a tip end of a rear curtain side arm 37*a* of the above described rear curtain locking member 37. When the rear curtain locking part 37*b* enters the rotation locus of the locked part 29*d* of the rear curtain driving member 29, the locked part 29*d* and the rear curtain locking part 37*b* engage with each other to inhibit the clockwise rotation of the rear curtain driving member 29 (namely, the closing operation of the rear curtain). At this time, a force to enter the rotation locus of the locked part 29*d* more deeply acts on the rear curtain locking part 37*b* by the rear curtain locking member pulling spring 38, and therefore, engagement of the rear curtain locking part 37*b* and the locked part 29*d* is not easily released. As shown in FIG. 10, a side surface 37*d* of a front curtain side arm 37*c* of the rear curtain locking member 37 engages with the front curtain drive pin 20*c* planted on the undersurface of the front curtain driving member 20, and the rear curtain locking member 37 is restrained from rotating counterclockwise around the shaft 1*ha*. Reference numeral and character 37*e* denotes a vertical folded part provided at the front curtain side arm 37*c* of the rear curtain locking member 37, and is located in the vicinity of the tip end suction surface of the yoke 25 of the magnet for the front curtain. In a state in which the front curtain reaches the state where it complete running, and the armature 23 of the magnet for the front curtain is located in a separating position, energization for the coil 26 of the magnet for the front curtain is increased to a predetermined value which is larger than energization at a normal shutter time control operation. Thereupon, the vertical folded part 37*e* is sucked by the yoke 25 against the force of the rear curtain locking member pulling spring 38. At this time, the rear curtain locking member 37 rotates clockwise, engagement of the rear curtain locking part 37*b* and the locked part 29*d* of the rear curtain driving member is released, and clockwise rotation of the rear curtain driving member 29 (namely, the closing operation of the rear curtain) is made possible.

In FIGS. 12 and 13, reference numeral 51 denotes a camera body of the digital single lens reflex camera, reference numeral 52 denotes an image pick up lens, reference numeral 53 is a main mirror, reference numeral 54 denotes a penta roof prism, and reference numeral 55 denotes an ocular lens. Reference numeral 56 denotes a focal-plane shutter device (shutter unit), reference numeral 57 denotes an image pick up element which receives an object image and converts it into visual image data, and reference numeral 58 denotes an infrared ray cut filter or a low-pass filter disposed at a front surface of the image pick up element. Reference numeral 59 denotes a back monitor such as an LCD capable of continuously obtaining a visual image data from the image pick up element and displaying a visual image.

Next, in a camera including a shutter device of the above described construction, the case where photographing is performed under various kinds of conditions from the OVF (optical finder) observation state shown in FIG. 12 will be described hereinafter. An operation when photographing is performed under various kinds of conditions from an EVF (electron view finder) observation state in FIG. 13 will be described hereinafter.

First, photographing is performed from the OVF (optical finder) observation state in FIG. 12, and an operation in a shorter exposure time than the shortest fully open exposure time (for example, 1/125 seconds) will be described by using FIGS. 4, 6, 9 and 10.

In the state in which running preparation is completed in FIG. 4, the charge lever 18 keeps the front curtain (constituted of the respective members 2 to 9) and the rear curtain (constituted of the respective members 10 to 17) in an overcharge state, the front curtain closes the shutter opening 1*a*, and the rear curtain opens the shutter opening 1*a*. When a shutter release signal occurs in this state, the armatures 23 and 32 are suction-held by the respective magnet for the front curtain and magnet for the rear curtain which are energized under the conditions at the time of a normal shutter time control operation. The magnet for the front curtain is constituted of the respective members 25 and 26, and the magnet for the rear curtain is constituted of the respective members 34 and 35. When the main mirror 53 inside the image pick up optical path as shown in FIG. 12 retreats outside the image pick up optical path, the charge lever 18 rotates counterclockwise in FIG. 4, linking to the movement of the main mirror 53 to be in the state to allow the front curtain and the rear curtain to run. In the rear curtain locking member 37, the side surface 37*d* of the front curtain side arm 37*c* follows the movement of the front curtain drive pin 20*c* planted on the undersurface of the front curtain driving member 20, but the front curtain has not completed running yet. Therefore, the rear curtain locking part 37*b* of the rear curtain locking member 37 retreats outside the rotation locus of the locked part 29*d* of the rear curtain driving member 29, and the closing operation of the rear curtain is allowed.

On exposure, energization of the magnet for the front curtain is cut off first, and suction of the armature 23 by the magnet for the front curtain is released. Then, the front curtain rotates the first arm 6 and the second arm 7 shown in FIGS. 2 and 3 clockwise by the force of the front curtain driving spring 22 which causes the front curtain driving member 20 to generate a clockwise rotational force. With this, the front curtain moves to the position in FIG. 6 to open the shutter opening 1*a* toward a lower position from an upper position of the shutter opening 1*a*. At this time, the front slit forming curtain 2, the first front curtain 3, the second front curtain 4 and the third front curtain 5 of the front cover curtains move while keeping the slit forming front curtain 2 and the first front curtain 3, the second front curtain 4 and the third front curtain 5 parallel with respect to the long side of the shutter opening 1*a* by the action of the parallel link.

FIG. 6 shows a running start state of slit exposure showing short time exposure. The front curtain driving member 20 slightly rotates clockwise, but the side surface 37*d* of the front curtain side arm 37*c* of the rear curtain locking member 37 is inhibited by the front curtain drive pin 20*c* planted on the undersurface of the front curtain driving member 20. Therefore, the rear curtain locking member 37 does not rotate clockwise around the shaft 1*ha* shown in FIG. 10. The rear curtain locking part 37*b* of the rear curtain locking member 37 still remains retreating outside the rotation locus of the locked part 29*d* of the rear curtain driving member 29, and therefore, the closing operation of the rear curtain is allowed.

When the time to form a predetermined exposure time is clocked, energization of the magnet for the rear curtain is cut off. When suction of the armature 32 by the magnet for the rear curtain is released, the rear curtain rotates the first arm 14 and the second arm 15 clockwise by the force of the rear curtain driving spring 31 which causes the rear curtain driving member 29 to generate a clockwise rotational force. With this, through the state of FIG. 8, the rear curtain moves to the position in FIG. 9 to close the shutter opening 1*a* toward the lower position from the upper position of the shutter opening 1*a*, and exposure is finished. At this time, the back slit forming curtain 10 and the first rear curtain 11, the second rear curtain 12 and the third rear curtain 13 of the back cover curtains move while keeping the slit forming end 10*a*, and the first rear curtain 11, the second rear curtain 12 and the third rear curtain 13 parallel with respect to the long side of the shutter opening 1*a* by the action of the parallel link.

Immediately after the above described exposure is finished, the charge lever 18 is rotated clockwise by a charge mechanism not shown, and the front curtain and the rear curtain are set into the state in which running preparation is completed in FIG. 4 from the state in FIG. 9 to prepare for the next photographing.

Next, photographing is performed from the OVF (optical finder) observation state in FIG. 12, and an operation in the exposure time longer than the shortest fully open exposure time (for example, 1/125 seconds) and shorter than a predetermined fully open exposure time (for example, 5 seconds) will be described by using FIGS. 4 and 5 and FIGS. 7 to 11.

In the state in which running preparation is completed in FIG. 4, the charge lever 18 keeps the front curtain and the rear curtain in the overcharge state, the front curtain closes the shutter opening 1*a*, and the rear curtain opens the shutter opening 1*a*. When a shutter release signal occurs in this state, the armatures 23 and 32 respectively integrated with the front curtain driving member 20 and the rear curtain driving member 29 are suction-held by the respective magnets energized under the conditions at the time of the normal shutter time control operation. When the main mirror 53 retreats outside the photographing optical path, the charge lever 18 rotates counterclockwise, linking to the movement of the main mirror 53, to be in the state to allow the front curtain to run. The front curtain has not completed running yet. Therefore, the rear curtain locking part 37*b* of the rear curtain locking member 37 retreats outside the rotation locus of the locked part 29*d* of the rear curtain driving member, and the closing operation of the rear curtain is allowed.

On exposure, energization of the magnet for the front curtain is cut off first, and suction of the armature 23 by the front curtain magnet is released. Then, the front curtain rotates the first arm 6 and the second arm 7 clockwise by the force of the front curtain driving spring 22 which causes the front curtain driving member 20 to generate a clockwise rotational force. With this, the front curtain moves to the position in FIG. 5 to open the shutter opening 1*a* toward a lower position from an upper position of the shutter opening 1*a*. At this time, the front slit forming curtain 2, and the first front curtain 3, the second front curtain 4 and the third front curtain 5 of the front cover curtains move while keeping the front curtain slit forming part and the first front curtain 3, the second front curtain 4 and the third front curtain 5 parallel with respect to the long side of the shutter opening 1*a* by the action of the parallel link.

FIG. 5 shows a state in which running for exposure starts. The front curtain driving member 20 slightly rotates clockwise, but the side surface 37*d* of the front curtain side arm 37*c* of the rear curtain locking member 37 is inhibited by the front curtain drive pin 20*c* planted on the undersurface of the front curtain driving member 20. Therefore, the rear curtain locking member 37 does not rotate clockwise around the shaft 1*ha*. The rear curtain locking part 37*b* of the rear curtain locking member 37 still remains retreating outside the rotation locus of the locked part 29*d* of the rear curtain driving member 29, and therefore, the closing operation of the rear curtain is allowed.

However, timing for the rear curtain to start running is not provided yet, and therefore, the shutter device shifts to the state in FIG. 7 in which the shutter opening 1*a* is opened with the front curtain running completed. Immediately before running of the front curtain is completed, engagement of the front curtain drive pin 20*c* planted on the undersurface of the front curtain driving member 20 and the side surface 37*d* of the front curtain side arm 37*c* of the rear curtain locking member 37 is released as shown in FIG. 11. The rear curtain locking member 37 rotates around the shaft 1*ha* (counterclockwise) by the force of the rear curtain locking member pulling spring 38. Thereby, the rear curtain locking part 37*b* of the rear curtain locking member 37 enters the rotation locus of the locked part 29*d* of the rear curtain driving member 29, and therefore, the closing operation is inhibited if things go the way they are.

Thus, in the timing immediately before exposure time previously which is previously set or arithmetically operated, energization for the coil 26 of the magnet for the front curtain is increased to a predetermined value which is larger than energization at the time of a normal shutter time control operation. Then, the vertical folded part 37*e* is sucked by the yoke 25 as shown in FIG. 10 against the force of the rear curtain locking member pulling spring 38, and therefore, the rear curtain locking member 37 rotates clockwise. As a result, engagement of the rear curtain locking part 37*b* and the locked part 29*d* of the rear curtain driving member 29 is released, thus making clockwise rotation of the rear curtain driving member 29 (namely, the closing operation of the rear curtain) possible.

When the time to form a predetermined exposure time is clocked, energization of the magnet for the rear curtain is cut off, and suction of the armature 32 by the rear curtain magnet is released. Then, the rear curtain rotates the first arm 14 and the second arm 15 clockwise by the force of the rear curtain driving spring 31 which causes the rear curtain driving member 29 to generate a clockwise rotational force. With this, the rear curtain moves to the position in FIG. 9 to close the shutter opening 1a toward the lower position from the upper position of the shutter opening 1a, and exposure is finished. At this time, the back slit forming curtain 10, and the first rear curtain 11, the second rear curtain 12 and the third rear curtain 13 of the back cover curtains move while keeping the rear curtain slit forming part 10a, and the first rear curtain 11, the second rear curtain 12 and the third rear curtain 13 parallel with respect to the long side of the shutter opening 1a by the action of the parallel link.

Immediately after the above described exposure is finished, the charge lever 18 is rotated clockwise by a charge mechanism not shown, and the front curtain and the rear curtain are set into the state in which running preparation is completed in FIG. 4 from the state in FIG. 9 to prepare for the next photographing.

Next, photographing is performed from the OVF (optical finder) observation state, and an operation in the exposure time longer than a valve or a predetermined fully open exposure time (for example, 5 seconds) will be described by using FIGS. 4, 5, 7, 9 and 11.

In the state in which running preparation is completed in FIG. 4, the charge lever 18 keeps the front curtain and the rear curtain in the overcharge state, the front curtain closes the shutter opening 1a, and the rear curtain opens the shutter opening 1a. When a shutter release signal occurs in this state, the armatures 23 and 32 respectively integrated with the front curtain driving member 20 and the rear curtain driving member 29 are suction-held by the magnets for the respective curtains which are energized under the conditions at the time of the normal shutter time control operation. When the main mirror 53 retreats outside the photographing optical path, the charge lever 18 rotates counterclockwise, linking to the movement of the main mirror 53, and the front curtain is brought into the state in which it is allowed to run. The front curtain has not completed running yet. Therefore, the rear curtain locking part 37b of the rear curtain locking member 37 retreats outside the rotation locus of the locked part 29d of the rear curtain driving member, and therefore the closing operation of the rear curtain is allowed.

On exposure, energization of the magnet for the front curtain is cut off first, and suction of the armature 23 by the magnet for the front curtain is released. Then, the front curtain rotates the first arm 6 and the second arm 7 clockwise by the force of the front curtain driving spring 22 which causes the front curtain driving member 20 to generate a clockwise rotational force. With this, the front curtain moves to the position in FIG. 5 to open the shutter opening 1a toward a lower position from an upper position of the shutter opening 1a. At this time, the front slit forming curtain 2, and the first curtain 3, the second curtain 4 and the third curtain 5 of the front cover curtains move while keeping the slit forming front curtain 2, and the first front curtain 3, the second front curtain 4 and the third front curtain 5 parallel with respect to the long side of the shutter opening 1a by the action of the parallel link.

FIG. 5 shows a running starting state. The front curtain driving member 20 slightly rotates clockwise, but the side surface 37d of the front curtain side arm 37c of the rear curtain locking member 37 is inhibited by the front curtain drive pin 20c planted on the undersurface of the front curtain driving member 20. Therefore, the rear curtain locking member 37 does not rotate around the shaft 1ha (counterclockwise). The rear curtain locking part 37b of the rear curtain locking member 37 still remains retreating outside the rotation locus of the locked part 29d of the rear curtain driving member 29, and therefore, the closing operation of the rear curtain is allowed.

However, timing for the rear curtain to start running is not provided yet, and therefore, the shutter device shifts to the state in which the front curtain running is completed and the shutter opening 1a is opened. Immediately before running of the front curtain is completed, engagement of the front curtain drive pin 20c planted on the undersurface of the front curtain driving member 20 and the side surface 37d of the front curtain side arm 37c of the rear curtain locking member 37 is released as shown in FIG. 11. The rear curtain locking member 37 rotates around the shaft 1ha (counterclockwise) by the force of the rear curtain locking member pulling spring 38. Thereby, the rear curtain locking part 37b of the rear curtain locking member 37 enters the rotation locus of the locked part 29d of the rear curtain driving member as shown in FIG. 7, and therefore, the closing operation is inhibited.

When energization of the magnet for the rear curtain is cut off in this state, the rear curtain driving member 29 slightly rotates clockwise, and the locked part 29d of the rear curtain driving member 29 completely engages with the rear curtain locking part 37b of the rear curtain locking member 37. Since the counterclockwise force is applied to the rear curtain locking part 37b, it is not easily disengaged and the engaged state is maintained. Accordingly, the shutter opening 1a can be opened for a long time without continuing energization for the coil 35 of the magnet for the rear curtain.

Next, in timing of valve release, or in timing immediately before exposure time which is previously set or arithmetically operated, the coil 35 of the magnet for the rear curtain is energized, and the rear curtain driving member 29 is extremely slightly rotated counterclockwise by a magnetic force to cause the armature 32 to be sucked by the yoke 34 again. Thereby, the locked part 29d of the rear curtain driving member is slightly lifted from the rear curtain locking part 37b of the rear curtain locking member 37. Then, energization to the coil 26 of the magnet for the front curtain is increased to a predetermined value which is larger than energization at the time of a normal shutter time control operation. Thereupon, the vertical folded part 37e is sucked by the yoke 25 against the force of the rear curtain locking member pulling spring 38, and the rear curtain locking member 37 rotates clockwise. Thereby, the rear curtain locking part 37b of the rear curtain locking member 37 retreats outside the rotation locus of the locked part 29d of the rear curtain driving member, and therefore, clockwise rotation of the rear curtain driving member 29 (namely, closing operation of the rear curtain) is made possible.

Immediately after timing of valve release, or when a previously set or arithmetically operated exposure time is clocked, energization of the magnet for the rear curtain is cut off and suction of the armature 32 is released. Then, the rear curtain rotates the first arm 14 and the second arm 15 clockwise by the force of the rear curtain driving spring 31 which causes the rear curtain driving member 29 to generate a clockwise rotational force. When energization of the magnet for the rear curtain is cut off as described above, and suction of the armature 32 is released to start running of the rear curtain, energization for the coil 26 of the magnet for the front curtain which sucks the vertical folded part 37e of the rear curtain locking member 37 is cut off. With this, the rear curtain moves to the position in FIG. 9 to close the shutter opening 1a toward a lower position from an upper position of the shutter opening 1a, and exposure is finished. At this time, the back slit forming curtain 10, and the first rear curtain 11, the second rear curtain 12 and the third rear curtain 13 of the back cover curtains move while keeping the rear curtain slit forming part 10a, and the first rear curtain 11, the second rear curtain 12 and the third rear curtain 13 parallel by the action of the parallel link.

Immediately after the above-described exposure is finished, the charge lever 18 is rotated clockwise by the charge mechanism not shown, the front curtain and the rear curtain are set to the state in which the running preparation is completed in FIG. 4 from the state in FIG. 9 to prepare for the next photographing.

Next, an operation from the EVF (back monitor such as an LCD) observation state shown in FIG. 13 to photographing will be described by using FIGS. 4, 7 and 11.

In the state where the running preparation is completed in FIG. 4, the charge lever 18 keeps the front curtain and the rear curtain in the overcharge state, the front curtain closes the shutter opening 1a, and the rear curtain opens the shutter opening 1a. When the photographer performs EVF mode setting via an EVF mode setting device not shown, the main mirror 53 starts a retreating operation to an outside of a photographing optical path of the photographing lens 52. At the early time of the retreating operation of the main mirror 53, in the shutter device, the armature 32 integrated with the rear curtain driving member 29 is suction-held by the magnet for the rear curtain energized under the conditions at the time of the normal shutter time control operation. When the main mirror 53 retreats outside the photographing optical path, the charge lever 18 rotates counterclockwise by being linked to the movement of the main mirror 53. Since the magnet for the front curtain is not energized, the armature 23 for the front curtain is not suction-held, and the front curtain opens the shutter opening 1a, following the counterclockwise rotation of the charge lever 18. In this process, the side surface 37d of the front curtain side arm 37c of the rear curtain locking member 37 follows the movement of the front curtain drive pin 20c planted on the undersurface of the front curtain driving member 20. Here, since the front curtain has not completed running yet, the rear curtain locking part 37b of the rear curtain locking member 37 retreats outside the rotation locus of the locked part 29d of the rear curtain driving member 29, and the closing operation of the rear curtain is also allowed. However, the rear curtain driving member 29 is suction-held by the magnet for the rear curtain via the armature 32 as described above, and therefore, the rear curtain does not perform a closing operation.

Meanwhile, immediately before the front curtain running completes, the rear curtain locking member 37 is released from the rotation restraint at the side surface 37d of the front curtain side arm 37c by the front curtain drive pin 20c planted on the undersurface of the front curtain driving member 20. The rear curtain locking member 37 rotates around the shaft 1ha (counterclockwise) by the force of the rear curtain locking member pulling spring 38. Thereby, the rear curtain locking part 37b of the rear curtain locking member 37 enters the rotation locus of the locked part 29d of the rear curtain driving member 29 as shown in FIG. 7, and therefore, the closing operation of the rear curtain is inhibited.

When energization to the above described magnet for the rear curtain is cut off in the state shown in FIG. 7, the rear curtain driving member 29 extremely slightly rotates clockwise, and the locked part 29d of the rear curtain driving member 29 completely engages with the rear curtain locking part 37b of the rear curtain locking member 37. The counterclockwise force is applied to the rear curtain locking part 37b, and therefore, it does not easily disengage and the engaging state is maintained. Accordingly, the shutter opening 1a is kept in the open state, and the object from the image pick up lens 52 can be continuously picked up. Thereby, energization to both the magnets for the front curtain and the rear curtain is stopped, and observation of the object image by the EVF (back monitor such as an LCD) is made possible. In addition, a space between the armature 32 and the yoke 34, which construct the magnet for the rear curtain, is kept in the small state, and therefore, possibility of dust entering the suction surface becomes low, and suction failure can be prevented.

When the photographer operates a release button not shown and a shutter release signal occurs, the charge lever 18 rotates clockwise by the shutter charge mechanism not shown to charge the front curtain, and is once brought into the state where the running preparation is completed in FIG. 4. Immediately thereafter, the respective armatures 23 and 32 integrated with the front curtain driving member 20 and the rear curtain driving member 29 are suction-held by the respective magnets energized under the conditions at the time of a normal shutter time control operation. Subsequently, the charge lever 18 rotates counterclockwise, and the front curtain is in the state in which it is allowed to run. The rear curtain locking part 37b of the rear curtain locking member 37 enters the rotation locus of the locked part 29d of the rear curtain driving member, and therefore, the rear curtain is inhibited from performing a closing operation.

The following three cases are considered depending on whether exposure time is longer or shorter than the shortest fully open exposure time, and whether exposure time is longer or shorter than a valve or a predetermined fully open exposure time.

<<Exposure Time Shorter Than the Shortest Fully Open Exposure Time (For Example, 1/125 Seconds)>>

When energization of the front curtain time controlling magnet is cut off, and suction of the armature 23 is released first, the front curtain rotates the first arm 6 and the second arm 7 clockwise by the force of the front curtain driving spring 22 which causes the front curtain driving member 20 to generate a clockwise rotational force. With this, the front curtain moves to the position in FIG. 6 to open the shutter opening 1a toward a lower position from an upper position of the shutter opening 1a. At this time, the front slit forming curtain 2, and the first front curtain 3, the second front curtain 4 and the third front curtain 5 of the front cover curtains move while keeping the front curtain slit forming part, and the first front curtain 3, the second front curtain 4 and the third front curtain 5 parallel with respect to the long side of the shutter opening 1a by the action of the parallel link.

FIG. 6 shows a running starting state of the slit exposure showing short time exposure. The front curtain driving member 20 slightly rotates clockwise, but the side surface 37d of the front curtain side arm 37c of the rear curtain locking member 37 is inhibited by the front curtain drive pin 20c planted on the undersurface of the front curtain driving member 20. Therefore, the rear curtain locking member 37 does not rotate around the shaft 1ha (clockwise). The rear curtain locking part 37b of the rear curtain locking member 37 still remains retreating outside the rotation locus of the locked part 29d of the rear curtain driving member, and therefore, the closing operation of the rear curtain is allowed.

When the time to form a predetermined exposure time is counted, energization of the magnet for the rear curtain is cut off, and suction of the armature 32 is released. Then, the rear curtain rotates the first arm 14 and the second arm 15 clockwise by the force of the rear curtain driving spring 31 which causes the rear curtain driving member 29 to generate a clockwise rotational force. With this, the rear curtain moves to the position in FIG. 9 to close the shutter opening 1a toward a lower position from an upper position of the shutter opening 1a, and exposure is finished. At this time, the back slit forming curtain 10, and the first rear curtain 11, the second rear curtain 12 and the third rear curtain 13 of the back cover curtains move while keeping the rear curtain slit forming part 10a, and the first rear curtain 11, the second rear curtain 12 and the third rear curtain 13 parallel with respect to the long side of the shutter opening 1a by the action of the parallel link.

Immediately after the above described exposure is finished, the charge lever 18 is rotated clockwise by the charge mechanism not shown, the front curtain and the rear curtain are set to the state where the running preparation is completed in FIG. 4 from the state in FIG. 9 to prepare for the next photographing.

<<Exposure Time Longer Than the Shortest Fully Open Exposure Time (For Example, 1/125 Seconds) and Shorter Than a Predetermined Fully Open Exposure Time (For Example, 5 Seconds)>>

When energization of the time controlling front curtain magnet is cut off, and suction of the armature 23 is released first, the front curtain rotates the first arm 6 and the second arm 7 clockwise by the force of the front curtain driving spring 22 which causes the front curtain driving member 20 to generate a clockwise rotational force. With this, the front curtain moves to the position in FIG. 5 to open the shutter opening 1a toward a lower position from an upper position of the shutter opening 1a. At this time, the front slit forming curtain 2, and the first curtain 3, the second curtain 4 and the third curtain 5 of the front cover curtains move while keeping the front curtain slit forming part and the first front curtain 3, the second front curtain 4 and the third front curtain 5 parallel with respect to the long side of the shutter opening 1a by the action of the parallel link.

FIG. 5 shows a running starting state for exposure. The front curtain driving member 20 slightly rotates clockwise, but the side surface 37d of the front curtain side arm 37c of the rear curtain locking member 37 is inhibited by the front curtain drive pin 20c planted on the undersurface of the front curtain driving member 20. The rear curtain locking member 37 does not rotate around the shaft 1ha (counterclockwise). The rear curtain locking part 37b of the rear curtain locking member 37 still remains retreating outside the rotation locus of the locked part 29d of the rear curtain driving member, and therefore, the closing operation of the rear curtain is allowed.

However, timing for the rear curtain to start running is not provided yet, and therefore, the shutter device shifts to the state in FIG. 7 in which the front curtain running is completed and the exposure opening is opened. Immediately before running of the front curtain is completed, engagement of the front curtain drive pin 20c planted on the undersurface of the front curtain driving member 20 and the side surface 37d of the front curtain side arm 37c of the rear curtain locking member 37 is released as shown in FIG. 11. The rear curtain locking member 37 rotates around the shaft 1ha (counterclockwise) by the force of the rear curtain locking member pulling spring 38. The rear curtain locking part 37b of the rear curtain locking member 37 enters the rotation locus of the locked part 29d of the rear curtain driving member, and therefore, the closing operation is inhibited if things go the way they are.

Thus, in the timing immediately before the exposure time which is previously set or arithmetically operated, energization for the coil 26 of the magnet for the front curtain is increased to a predetermined value which is larger than energization at the time of a normal shutter time control operation. Then, the vertical folded part 37e is sucked by the yoke 25 against the force of the rear curtain locking member pulling spring 38, and therefore, the rear curtain locking member 37 rotates clockwise. As a result, engagement of the rear curtain locking part 37b and the locked part 29d of the rear curtain driving member is released, and clockwise rotation of the rear curtain driving member 29 (namely, the closing operation of the rear curtain) is made possible.

When the time to form the predetermined exposure time is clocked, energization of the time controlling rear curtain magnet is cut off, and suction of the armature 32 is released. Then, the rear curtain rotates the first arm 14 and the second arm 15 clockwise by the force of the rear curtain driving spring 31 which causes the rear curtain driving member 29 to generate a clockwise rotational force. With this, through the state of FIG. 8, the rear curtain moves to the position in FIG. 9 to close the shutter opening 1a toward a lower position from an upper position of the shutter opening 1a, and exposure is finished. At this time, the back slit forming curtain 10, the first rear curtain 11, the second rear curtain 12 and the third rear curtain 13 of the back cover curtains move while keeping the rear curtain slit forming part 10a, and the first rear curtain 11, the second rear curtain 12 and the third rear curtain 13 parallel with respect to the long side of the shutter opening 1a by the action of the parallel link.

Immediately after the above described exposure is finished, the charge lever 18 is rotated clockwise by the charge mechanism not shown, and the front curtain and the rear curtain are set to the state in which the running preparation is completed in FIG. 4 from the state in FIG. 9 to prepare for the next photographing.

<<Exposure Time Longer Than a Valve or a Predetermined Fully Open Exposure Time (For Example, 5 Seconds)>>

When energization of the time controlling front curtain magnet is cut off, and suction of the armature 23 is released first, the front curtain rotates the first arm 6 and the second arm 7 clockwise by the force of the front curtain driving spring 22 which causes the front curtain driving member 20 to generate a clockwise rotational force. With this, the front curtain moves to the position in FIG. 5 to open the shutter opening 1a toward a lower position from an upper position of the shutter opening 1a. At this time, the front slit forming curtain 2, and the first front curtain 3, the second front curtain 4 and the third front curtain 5 of the front cover curtains move while keeping the front curtain slit forming part, and the first front curtain 3, the second front curtain 4 and the third front curtain 5 parallel with respect to the long side of the shutter opening 1a by the action of the parallel link.

FIG. 5 shows a running starting state. The front curtain driving member 20 slightly rotates clockwise, but the side surface 37d of the front curtain side arm 37c of the rear curtain locking member 37 is inhibited by the front curtain drive pin 20c planted on the undersurface of the front curtain driving member 20. The rear curtain locking member 37 does not rotate around the shaft 1ha (counterclockwise). The rear curtain locking part 37b of the rear curtain locking member 37 still remains retreating outside the rotation locus of the locked part 29*d* of the rear curtain driving member, and therefore, the closing operation of the rear curtain is allowed.

However, timing for the rear curtain to start running is not provided yet, and therefore, the shutter device shifts to the state in FIG. 7 in which the front curtain running is completed and the exposure opening is opened. Immediately before running of the front curtain is completed, engagement of the front curtain drive pin 20*c* planted on the undersurface of the front curtain driving member 20 and the side surface 37*d* of the front curtain side arm 37*c* of the rear curtain locking member 37 is released as shown in FIG. 11. The rear curtain locking member 37 rotates around the shaft 1*ha* (counterclockwise) by the force of the rear curtain locking member pulling spring 38. The rear curtain locking part 37*b* of the rear curtain locking member 37 enters the rotation locus of the locked part 29*d* of the rear curtain driving member, and therefore, the closing operation is inhibited.

When energization of the time controlling rear curtain magnet is cut off in this state, the rear curtain driving member 29 slightly rotates clockwise, and the locked part 29*d* of the rear curtain driving member completely engages with the rear curtain locking part 37*b* of the rear curtain locking member 37. Since the counterclockwise force is applied to the rear curtain locking part 37*b*, it is not easily disengaged and the engaged state is maintained. Accordingly, the shutter opening 1*a* can be opened for a long time without continuing energization to the coil 35 of the magnet for the rear curtain.

Next, in timing of valve release, or in timing immediately before the exposure time which is previously set or arithmetically operated, the coil 35 of the magnet for the rear curtain is energized, and the rear curtain driving member 29 is extremely slightly rotated counterclockwise by a magnetic force to cause the armature 32 to be sucked by the yoke 34 again. Thereby, the locked part 29*d* of the rear curtain driving member is slightly lifted from the rear curtain locking part 37*b* of the rear curtain locking member 37. Immediately thereafter, energization to the coil 26 of the magnet for the front curtain is increased to a predetermined value which is larger than energization at the time of a normal shutter time control operation. Thereupon, the vertical folded part 37*e* is sucked by the yoke 25 against the force of the rear curtain locking member pulling spring 38, and the rear curtain locking member 37 rotates clockwise. Thereby, the rear curtain locking part 37*b* of the rear curtain locking member 37 retreats outside the rotation locus of the locked part 29*d* of the rear curtain driving member, and therefore, clockwise rotation of the rear curtain driving member 29 (namely, the closing operation of the rear curtain) is made possible.

Immediately after timing of valve release, or after a previously set or arithmetically operated exposure time is clocked, energization of the magnet for the rear curtain is cut off and suction of the armature 32 is released. The rear curtain rotates the first arm 14 and the second arm 15 clockwise by the force of the rear curtain driving spring 31 which causes the rear curtain driving member 29 to generate a clockwise rotational force. When energization of the magnet for the rear curtain is cut off, and suction of the armature 32 is released to start running of the rear curtain, energization to the coil 26 of the magnet for the front curtain which sucks the vertical folded part 37*e* of the rear curtain locking member 37 is cut off. With this, the rear curtain moves to the position in FIG. 9 to close the shutter opening 1*a* toward a lower position from an upper position of the shutter opening 1*a*, and exposure is finished. At this time, the back slit forming curtain 10, and the first rear curtain 11, the second rear curtain 12 and the third rear curtain 13 of the back cover curtains move while keeping the rear curtain slit forming part 10*a*, and the first rear curtain 11, the second rear curtain 12 and the third rear curtain 13 parallel with respect to the long side of the shutter opening 1*a* by the action of the parallel link.

Immediately after the above-described exposure is finished, the charge lever 18 is rotated clockwise by the charge mechanism not shown, the front curtain and the rear curtain are set to the state in which the running preparation is completed in FIG. 14 from the state in FIG. 9 to prepare for the next photographing.

According to the above embodiment, when the suction of the front curtain driving member 20 is released in the state in which the front curtain driving member 20 and the rear curtain driving member 29 are suction-held by the magnets for the front and rear curtains, the front curtain runs. When running of the front curtain is completed and the shutter opening 1*a* fully opens, the rear curtain locking member 37 enters the rotation locus of the rear curtain driving member 29. This inhibits the rear curtain from operating to such a state as to close the shutter opening 1*a* even if suction of the rear curtain driving member 29 by the magnet for the rear curtain is released. As a result, the shutter opening 1*a* can be kept open for a long time without keeping the magnet for the rear curtain energized at the time of long time exposure and EVF (back monitor such as an LCD) observation, and a large energy-saving effect is provided. In addition, long time energization accompanied by heat generation of the magnet for the rear curtain is not required, and therefore, poor control accuracy of exposure time due to heat generation of the magnet for the rear curtain can be eliminated, and reliability of the shutter device is enhanced.

By switching observation of an object to the OVF from the EVF, the focal-plane shutter is brought into a closed state. Therefore, if lens replacement is performed in this state, dust can be prevented from attaching to the image pick up element, and deterioration of the image pick up element can be prevented.

Displacement of the rear curtain locking member 37 to an outside of the rotation locus from the inside of the rotation locus of the rear curtain driving member 29, or to the inside of the rotation locus from the outside of the rotation locus is linked to the rotation of the front curtain driving member 20 and the suction operation of the rear curtain driving member 29 of the magnet for the rear curtain. Therefore, the displacement is not performed by preparing a new actuator, and the already existing members can be used. As a result, it is possible to add the function without complicating the construction of the shutter device.

This application claims priority from Japanese Patent Application No. 2004-286779 filed on Sep. 30, 2004, which is hereby incorporated by reference herein.

What is claimed is:

1. A shutter device, comprising:
a first light shielding plate and a second light shielding plate which are formed to open and close an opening;
a first driving member which includes a first armature, and is connected to said first light shielding plate to give an urging force to the first light shielding plate in a direction to open the opening;
a first electromagnetic device which makes said first light shielding plate in a first position capable of running in the direction to open the opening by being switched to a non-energized state from an energized state in which it holds said first light shielding plate in the first position by suction-holding the first armature;
a second driving member which includes a second armature, and is connected to said second light shielding plate and gives an urging force to the second light shielding plate in a direction to close the opening;
a second electromagnetic device for the second light shielding plate which makes said second light shielding plate in a second position capable of running in the direction to close the opening by being switched to a non-energized state from an energized state in which it holds said second light shielding plate in the second position by suction-holding the second armature; and
a locking member displaceable to a locking position to inhibit an operation of said second light shielding plate of running in the direction to close the opening, and an unlocking position to allow an operation of said second light shielding plate of running in the direction to close the opening,
wherein said locking member displaces to the locking position by the first light shielding plate running in the direction to open the opening, and displaces to the unlocking position by said first electromagnetic device being switched to the energized state from the non-energized state before said second light shielding plate starts running in the direction to close the opening.

2. The shutter device according to claim 1, wherein said locking member displaces to the locking position from the unlocking position, as said first light shielding plate runs to a predetermined position.

3. The shutter device according to claim 2, wherein said locking member displaces to the unlocking position from the locking position by restraint of said locking member by said first driving member being released as said first light shielding plate runs to the predetermined position.

4. The shutter device according to claim 1, further comprising:
a third driving member which gives an urging force to said locking member in a direction to displace to the locking position.

5. The shutter device according to claim 1, wherein said first electromagnetic device has a coil, suction-holds the first armature in the first position by the coil being energized, releases suction-holding of the first armature by energization of the coil being cut off to make said first light shielding plate capable of running in the direction to open the opening.

6. An image pick up apparatus, comprising:
a first light shielding plate and a second light shielding plate which are formed to open and close an opening;
a first driving member which includes a first armature, and is connected to said first light shielding plate to give an urging force to the first light shielding plate in a direction to open the opening;
a first electromagnetic device which makes said first light shielding plate in a first position capable of running in the direction to open the opening by being switched to a non-energized state from an energized state in which it holds said first light shielding plate in the first position by suction-holding the first armature;
a second driving member which includes a second armature, and is connected to said second light shielding plate to give an urging force to the second light shielding plate in a direction to close the opening;
a second electromagnetic device for the second light shielding plate which makes said second light shielding plate in a second position capable of running in the direction to close the opening by being switched to a non-energized state from an energized state in which it holds said second light shielding plate in the second position by suction-holding the second armature;
a locking member displaceable to a locking position to inhibit an operation of said second light shielding plate of running in the direction to close the opening, and an unlocking position to allow an operation of said second light shielding plate of running in the direction to close the opening;
an image pick up element which outputs an object image received via the opening as a visual image data when said locking member is in the locking position to inhibit the operation of said second light shielding plate of closing the opening; and
a visual image display device which continuously obtains the visual image data from said image pick up element and displays the visual image,
wherein said locking member displaces to the locking position by the first light shielding plate running in the direction to open the opening, and displaces to the unlocking position by said first electromagnetic device being switched to the energized state from the non-energized state before said second light shielding plate starts running in the direction to close the opening.

* * * * *